(12) United States Patent
Zhang et al.

(10) Patent No.: US 11,653,329 B2
(45) Date of Patent: May 16, 2023

(54) BEAM-SPECIFIC PAGE MONITORING

(71) Applicant: QUALCOMM Incorporated, San Diego, CA (US)

(72) Inventors: Nan Zhang, Beijing (CN); Linhai He, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 2 days.

(21) Appl. No.: 17/369,515

(22) Filed: Jul. 7, 2021

(65) Prior Publication Data
US 2022/0022160 A1 Jan. 20, 2022

Related U.S. Application Data

(60) Provisional application No. 63/062,344, filed on Aug. 6, 2020.

(51) Int. Cl.
*H04W 68/02* (2009.01)
*H04W 68/00* (2009.01)
*H04W 72/044* (2023.01)
*H04B 17/318* (2015.01)

(52) U.S. Cl.
CPC ........ *H04W 68/005* (2013.01); *H04B 17/318* (2015.01); *H04W 72/046* (2013.01)

(58) Field of Classification Search
CPC . H04W 68/005; H04W 68/02; H04W 72/046; H04W 76/27; H04W 16/28; H04B 17/318; H04B 17/27
See application file for complete search history.

(56) References Cited

U.S. PATENT DOCUMENTS

2019/0394749 A1* 12/2019 Islam ............... H04W 68/02
2020/0022041 A1  1/2020 Ly et al.

FOREIGN PATENT DOCUMENTS

WO   WO-2019099661 A1   5/2019

OTHER PUBLICATIONS

WO/2018/144873 A1 discloses apparatuses for transmission of paging blocks in swept downlink beams. (Year: 2018).*
International Search Report and Written Opinion—PCT/US2021/040835—ISA/EPO—dated Oct. 29, 2021.
Kaikkonen J., et al., "Main Radio Interface Related System Procedures," Apr. 24, 2020 (Apr. 24, 2020), 136 pages, XP055845846. Retrieved from the Internet: URL:https://onlinelibrary.wiley.com/doi/pdfdirect/10.1002/9781119582335.ch4 [retrieved on Sep. 29, 2021], Section 4.4, p. 1-p. I.

(Continued)

*Primary Examiner* — Siu M Lee
(74) *Attorney, Agent, or Firm* — Dang M. Vo

(57) ABSTRACT

Aspects of the present disclosure relate to wireless communications, and more particularly, to mobility techniques that allow for beam-specific paging in wireless communication systems. An example method generally includes transmitting, to a network entity, an indication of a mobility state of the UE, wherein the indication is transmitted based on a synchronization signal block (SSB) associated with a selected beam direction; and monitoring paging occasions for paging sent using a beam that is quasi-colocated with the selected beam direction associated with the SSB.

30 Claims, 11 Drawing Sheets

(56) References Cited

OTHER PUBLICATIONS

Qualcomm Inc: "Power Saving Enhancements for Paging Reception," 3GPP Draft, 3GPP TSG-RAN WG2 Meeting #111e, R2-2006608, 3rd Generation Partnership Project (3GPP), Mobile Competence Centre, 650, Route Des Lucioles, F-06921, Sophia-Antipolis Cedex, France, vol. RAN WG2 No, Online, Aug. 17, 2020-Aug. 28, 2020, Aug. 6, 2020 (Aug. 6, 2020), XP051910830, 3 pages, Retrieved from the Internet: URL: https://ftp.3gpp.org/tsg_ran/WG2_RL2/TSGR2_111-e/Docs/R2-2006608.zip R2-2006608_Power saving enhancements for paging reception.docx [retrieved on Aug. 6, 2020], the whole document.

Samsung: "Idle and Inactive Mode Aspects for an NTN—Observations and Proposals," 3GPP Draft, 3GPP TSG RAN WG2 Meeting #112, R2-2100254, 3rd Generation Partnership Project (3GPP), Mobile Competence Centre, 650, Route Des Lucioles, F-06921, Sophia-Antipolis Cedex, France, vol. RAN WG2, No. e-Meeting, Jan. 25, 2021-Feb. 5, 2021, Jan. 15, 2021 (Jan. 15, 2021), XP051973455, 10 pages, Retrieved from the Internet: URL: https://ftp.3gpp.org/tsg_ran/WG2_RL2/TSGR2_113-e/Docs/R2-2100254.zip R2-2100254_For8.10.3.2 IdleinactiveMode_ObservationsProposals_Samsung.doc[retrieved on Jan. 15, 2021], the whole document.

\* cited by examiner

BEAM-SPECIFIC PAGE MONITORING

CROSS-REFERENCE TO RELATED APPLICATIONS

This application claims benefit to U.S. Provisional Patent Application Ser. No. 63/062,344, entitled "Beam-Specific Page Monitoring" and filed Aug. 6, 2020, and PCT Application Serial No. PCT/CN2020/102317, entitled "Method and Apparatus for Single Beam Paging in 5G" and filed Jul. 16, 2020, the contents of both of which are assigned to the assignee hereof, and the contents of both of which are hereby incorporated by reference in their entirety.

TECHNICAL FIELD

Aspects of the present disclosure relate to wireless communications, and more particularly, to mobility techniques that allow for beam-specific (directional) page monitoring in wireless communication systems.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication by a user equipment (UE). The method generally includes transmitting, to a network entity, an indication of a mobility state of the UE, wherein the indication is transmitted based on a synchronization signal block (SSB) associated with a selected beam direction; and monitoring paging occasions for paging sent using a beam that is quasi-colocated with the selected beam direction associated with the SSB.

One innovative aspect of the subject matter described in this disclosure can be implemented in a method for wireless communication by a network entity. The method generally includes receiving, from a user equipment (UE), an indication of a mobility state of the UE, wherein the indication is received based on a synchronization signal block (SSB) associated with a selected beam direction; receiving, from a core network entity, a paging notification message indicating that paging is awaiting transmission to the UE and an indication that the UE supports beam-specific paging; and transmitting the page to the UE on a beam quasi-colocated with the selected beam direction associated with the SSB.

One innovative aspect of the subject matter described in this disclosure can be implemented in a method for wireless communication by a core network entity. The method generally includes receiving, from a user equipment (UE), a registration request including an indication that the UE supports beam-specific paging; and transmitting, to a network entity serving the UE, a paging notification message indicating that paging is awaiting transmission to the UE, wherein the paging notification message includes the indication that the UE supports beam-specific paging to trigger the network entity to transmit the paging on a specific beam.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure relate to wireless communications, and more particularly, to mobility techniques that allow for beam-specific (directional) page monitoring in wireless communication systems. As will be described in greater detail below, UEs that support beam-specific paging may monitor paging occasions based on a specific beam, which may reduce the amount of resources that are used to transmit paging from a network entity to a UE relative to transmission of paging on a plurality of beams during each paging occasion.

The following description provides examples and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
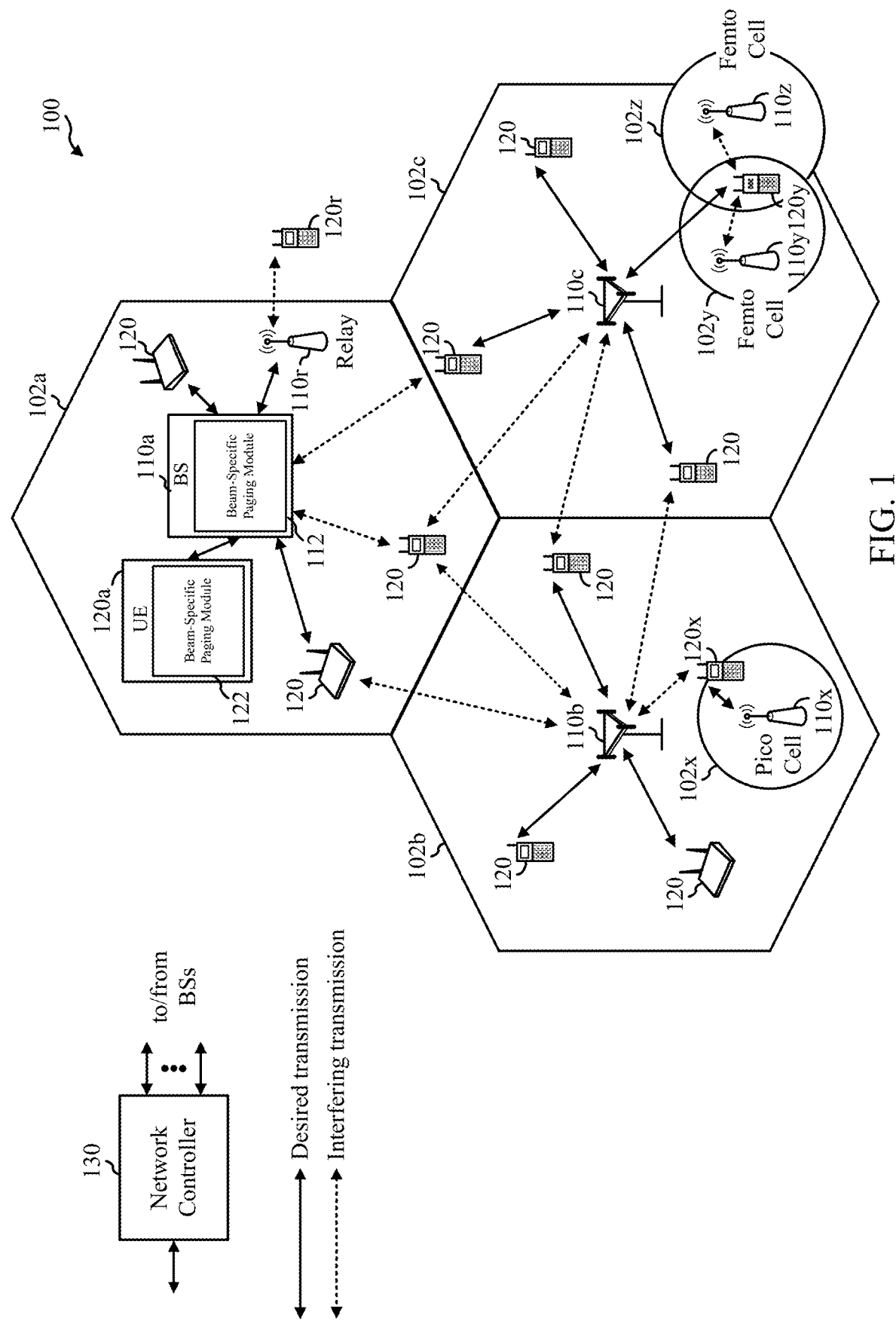
FIG. 1 shows an example wireless communication network in which some aspects of the present disclosure may be performed.

FIG. 1 illustrates an example wireless communication network 100 in which aspects of the present disclosure may be performed. For example, as shown in FIG. 1, UE 120a may include a beam-specific paging module 122 that may be configured to perform (or cause UE 120a to perform) operations 400 of FIG. 4. Similarly, a BS 120a may include beam-specific paging module 112 that may be configured to perform (or cause BS 110a to perform) operations 500 of FIG. 5 and/or operations 600 of FIG. 6.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
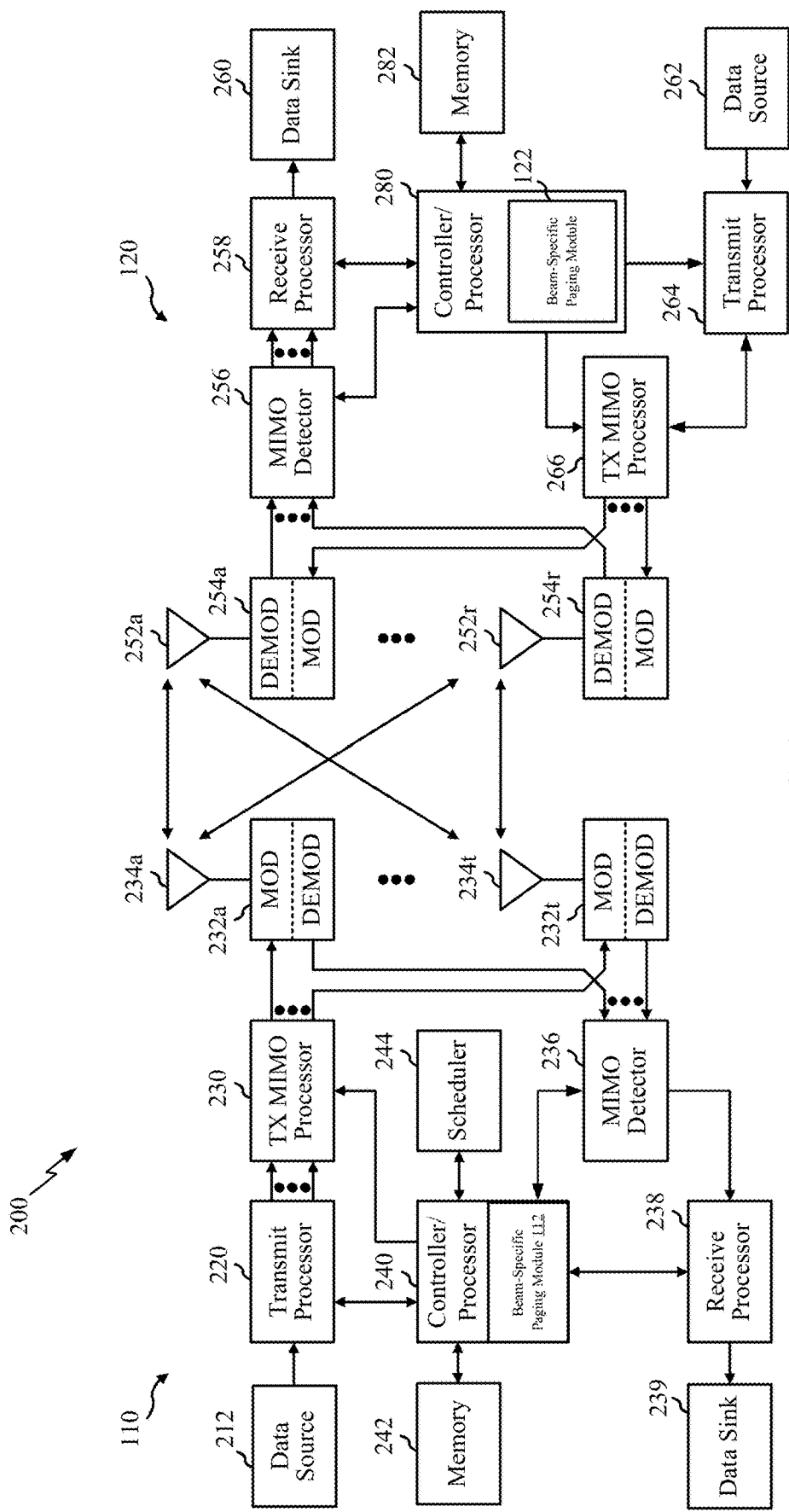
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a beam-specific paging module 122 that may be configured to perform (or cause UE 120 to perform) operations 400 of FIG. 4. Similarly, the BS 120a may include beam-specific paging module 112 that may be configured to perform (or cause BS 110a to perform) operations 500 of FIG. 5 and/or operations 600 of FIG. 6.

Figure 3A:
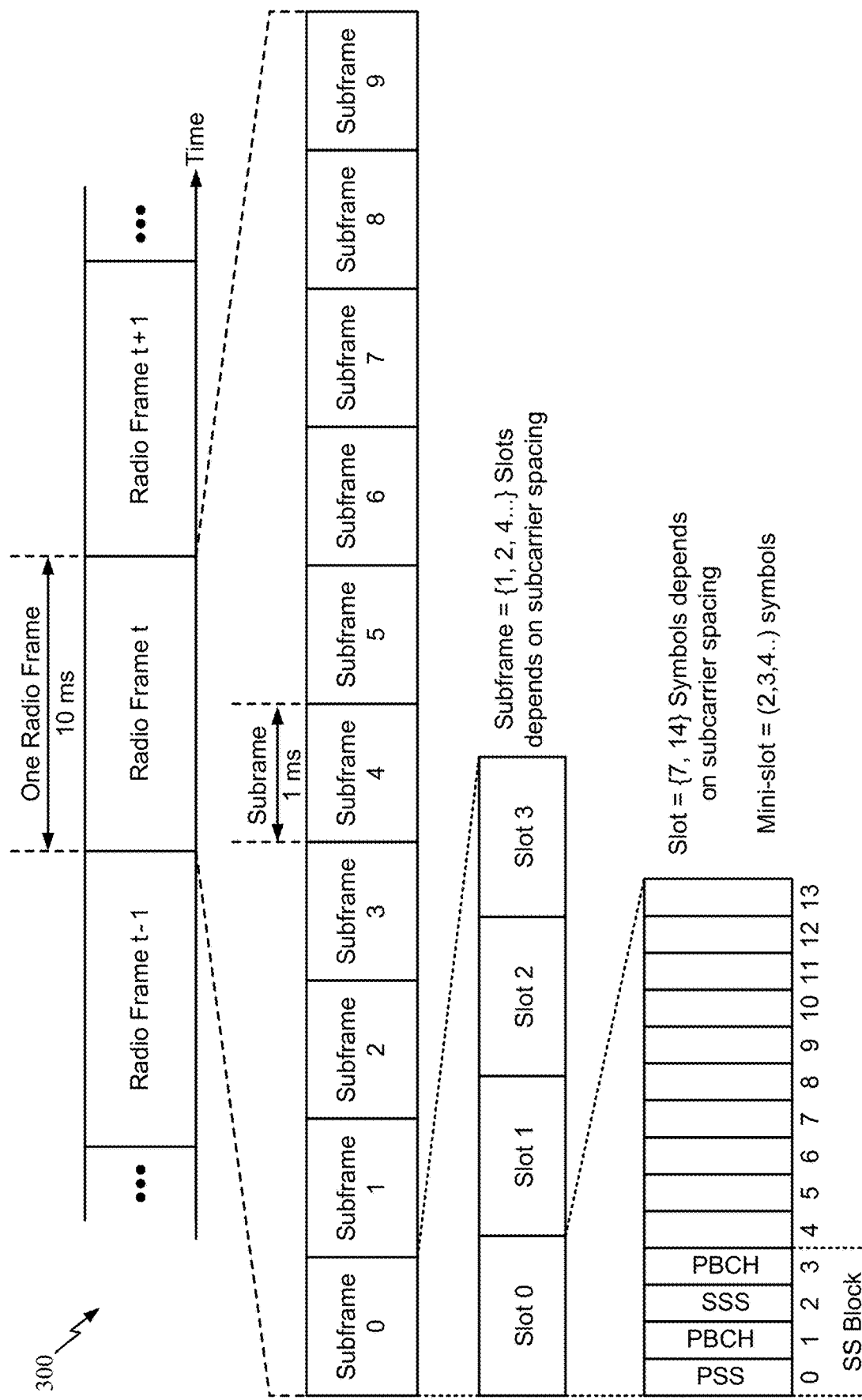
FIG. 3A illustrates an example of a frame format for a telecommunication system.

FIG. 3A is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3A. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIGs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 3B:
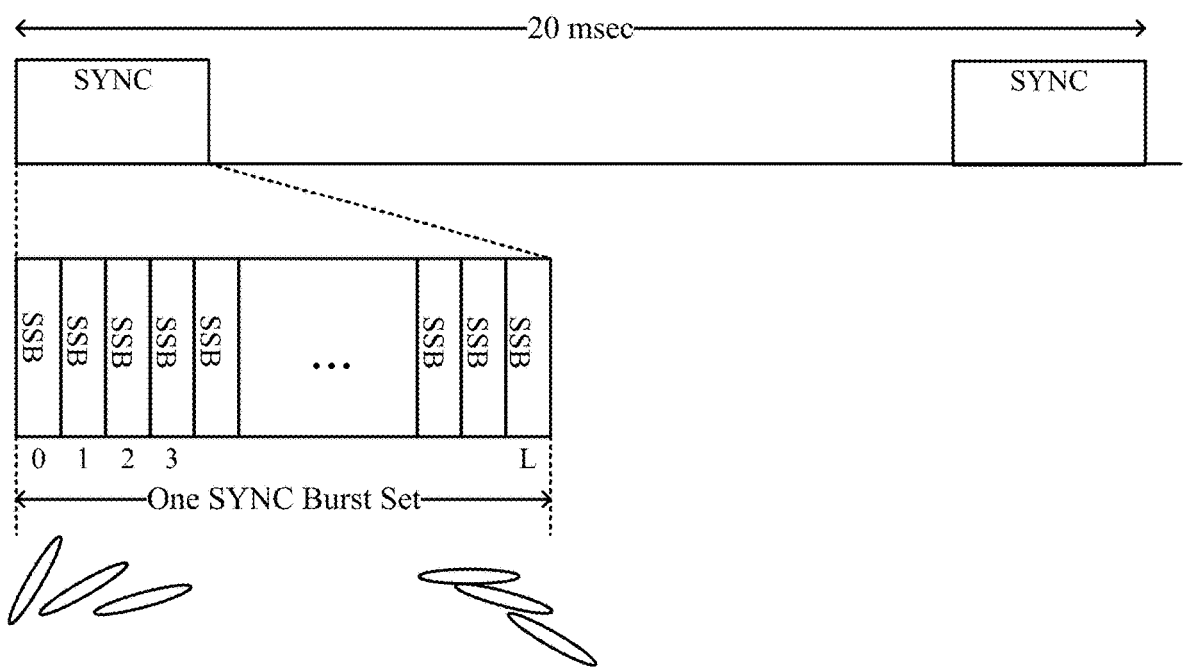
FIG. 3B illustrates how different synchronization signal blocks (SSBs) may be sent using different beams.

As shown in FIG. 3B, the SS blocks may be organized into SS burst sets to support beam sweeping. As shown, each SSB within a burst set may be transmitted using a different beam, which may help a UE quickly acquire both transmit (Tx) and receive (Rx) beams (particular for mmW applications). A physical cell identity (PCI) may still decoded from the PSS and SSS of the SSB.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Beam-Specific Page Monitoring

Aspects of the present disclosure relate to wireless communications, and more particularly, to techniques that allow for UEs to monitor paging occasions for paging using specific beams. As will be described in greater detail below, the UE may monitor paging occasions for paging using a specific beam when a UE reports, to a network entity, that the UE is in a first mobility state (e.g., stationary or substantially stationary) and may monitor paging occasions for paging using multiple beams when the UE reports, to the network entity, that the UE is in a second mobility state (e.g., in motion).

Generally, while a UE is in an idle or inactive mode (e.g., RRC Idle or RRC Inactive), the UE may monitor for paging messages in an allocated paging occasion on a paging channel. The UE need not maintain a transmit/receive beam pair with the network as it would if the UE were in a connected mode, as not maintaining a transmit/receive beam pair with the network may reduce UE power usage and overhead while the UE is in an idle or inactive mode. When the network has a page to transmit to the UE, the network entity may send a paging message on a plurality of beams (e.g., on each beam that the network entity can transmit on), as the network entity may not have knowledge of which receive beam the UE can use to receive the paging message.

While transmitting paging messages on each beam may work in low load scenarios, the overhead entailed by performing such transmissions may negatively impact wireless communication systems as the load on a cell increases (e.g., as additional UEs connect with a cell). For example, with the addition of a large number of Internet of Things (IoT) UEs to a network, which may outnumber other UEs such as smartphones or tablets, the load on the network may increase significantly, and thus, may increase the paging load. To accommodate the increase in UEs served by a cell and the paging needs of these UEs, multiple UEs may share a common paging occasion, though a paging message may be intended for only a subset of the UEs that share the common paging occasion. In such a case, the UEs that share the common paging occasion may decode a paging message sent by the network entity during the common paging occasion even though the information in the paging message may not be intended for all of the UEs that share the common paging occasion, which may cause unnecessary power consumption by the UEs for which the paging message was not intended.

Further, some UEs connected to a cell (e.g., IoT UEs) may be stationary or substantially stationary. For example, IoT smart utility meters are likely to be stationary devices. Because these UEs may be stationary, various assumptions may be made regarding the transmit and receive beams used by the UE to communicate with the network entity. For example, it may be assumed that a stationary UE is likely to use the same beams for communications with a network entity over time, (e.g., the receive beam of a station UE may be relatively stable) and this assumption may be leveraged, as discussed in further detail herein, to reduce paging overhead in wireless communication systems by using beam-specific paging for such devices.

Figure 4:
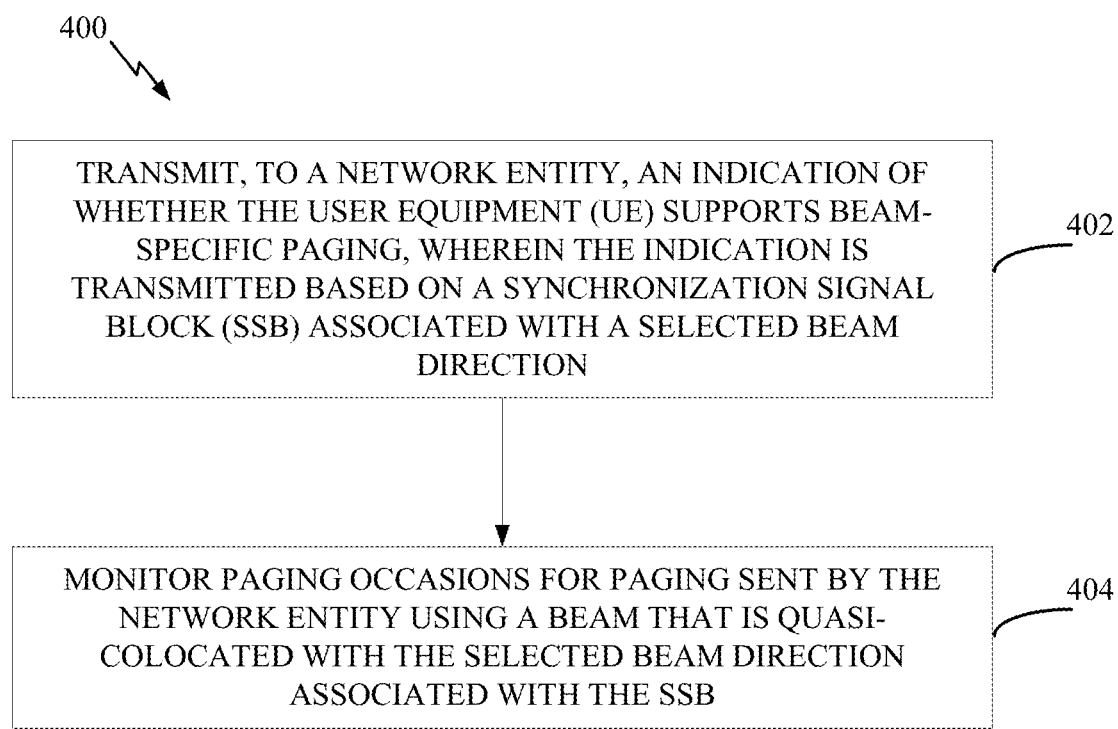
FIG. 4 illustrates example operations for wireless communication by a user equipment (UE), in accordance with some aspects of the present disclosure.

FIG. 4 illustrates example operations 400 that may be performed by a user equipment (UE) for beam-specific paging, in accordance with some aspects of the present disclosure.

As illustrated, operations 400 may begin at block 402, where a UE transmits, to a network entity, an indication of whether the UE supports beam-specific paging. The indication of whether the UE supports beam-specific paging may be based on the mobility state of the UE, as stationary or substantially stationary UEs may be able to support beam-specific paging while UEs in motion may not be able to support beam-specific paging. The indication may be transmitted based on a synchronization signal block (SSB) associated with a selected beam direction. For example, during a synchronization burst (as discussed above with respect to FIG. 3B), a UE may attempt to decode one or more SSBs, where each SSB is associated with a transmission beam direction from the network entity to the UE. When the UE registers (or updates a registration) with the network entity (e.g., in one or more messages exchanged during a random access procedure), the UE may include information identifying the SSB that the UE was able to decode, or the SSB with the strongest signal strength or quality metric of a plurality of SSBs that the UE was able to decode. The information identifying the SSB in the message transmitted to the network entity may be, as discussed, associated with a particular transmit beam from the network entity to the UE.

At block 404, the UE monitors paging occasions for paging sent using a beam that is quasi-colocated with the selected beam direction associated with the SSB.

Figure 5:
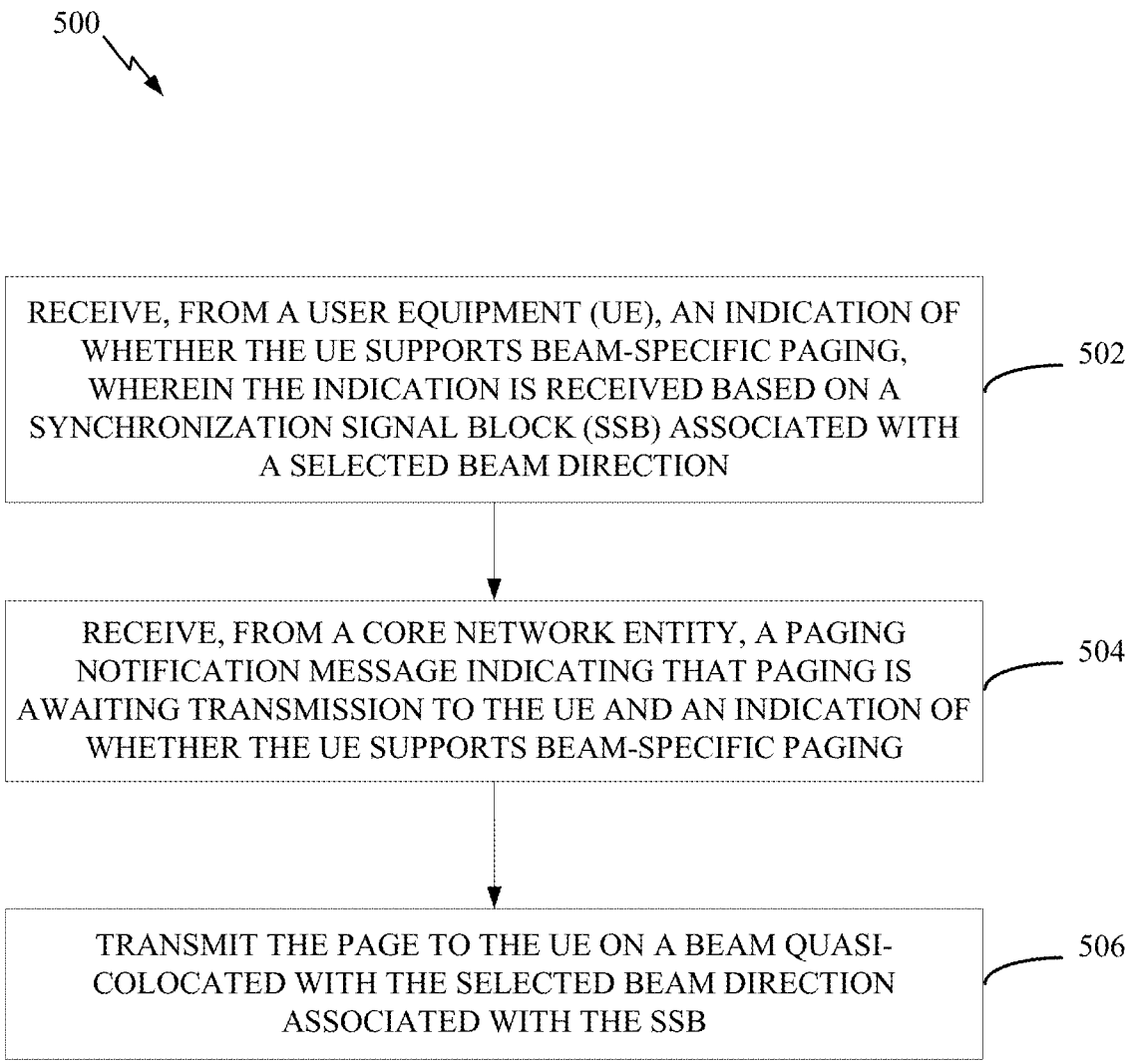
FIG. 5 illustrates example operations for wireless communication by a network entity, in accordance with some aspects of the present disclosure.

FIG. 5 illustrates example operations 500 that may be performed by a network entity, such as a gNodeB or a base station, for beam-specific paging, in accordance with some aspects of the present disclosure.

As illustrated, operations 500 may begin at block 502, where a network entity receives, from a user equipment (UE), an indication of a mobility state of the UE. The information may be received based on a synchronization signal block (SSB) associated with a selected beam direction. As discussed, the indication of a mobility state of the UE may be received in a registration request or registration update message and include information identifying a specific SSB that the UE was able to decode. The identified SSB may be associated with a particular transmit beam direction from the network entity to the UE.

At block 504, the network entity receives, from a core network entity, a paging notification message indicating that paging is awaiting transmission to the UE and an indication of the mobility state of the UE.

At block 506, the network entity transmits the page to the UE on a beam quasi-colocated with the selected beam direction associated with the SSB. The page may be transmitted, for example, during a paging occasion associated with the UE.

Figure 6:
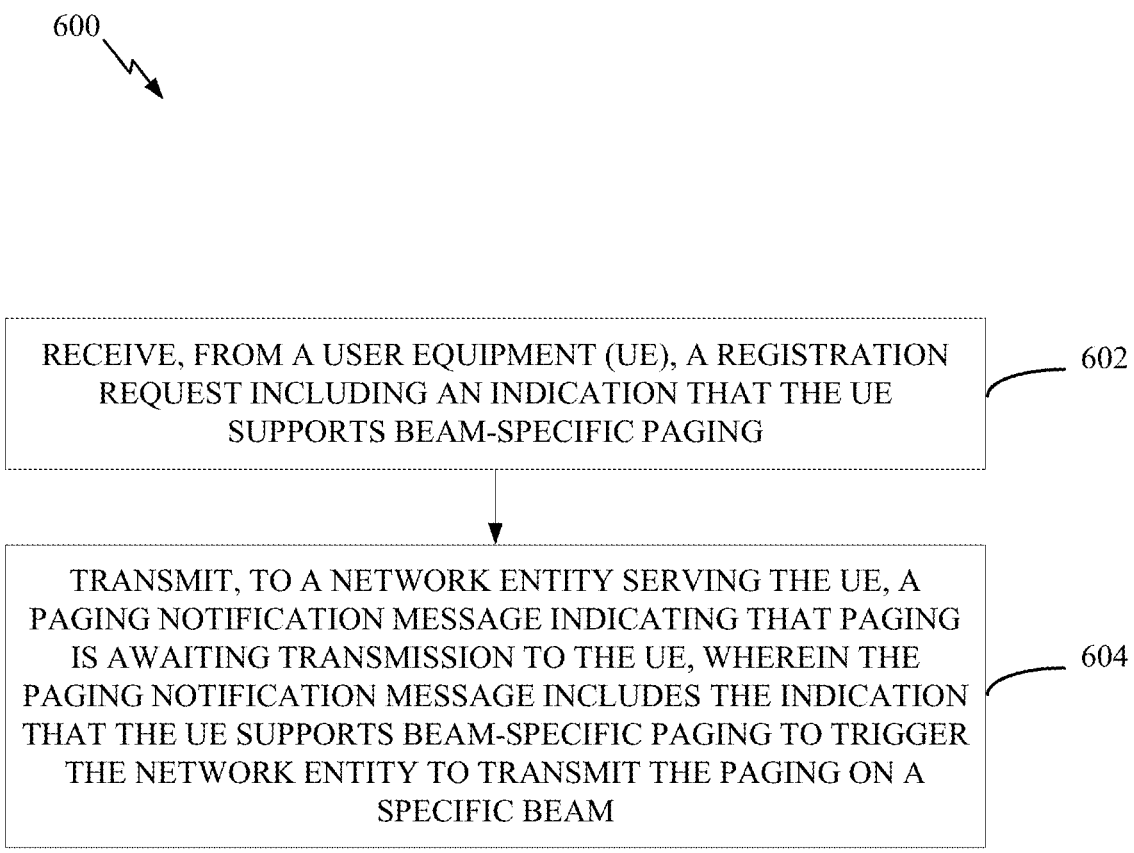
FIG. 6 illustrates example operations for wireless communication by a core network entity, in accordance with some aspects of the present disclosure.

FIG. 6 illustrates example operations 600 that may be performed by a core network entity for beam-specific paging, in accordance with some aspects of the present disclosure.

As illustrated, operations 600 may begin at block 602, where the core network entity receives, from a user equipment (UE), a registration request including an indication that the UE supports beam-specific paging. The registration request may be, for example, forwarded at least in part from the network entity (e.g., gNB) serving the UE.

At block 604, the core network entity transmits, to the network entity serving the UE, a paging notification message indicating that paging is awaiting transmission to the UE. The paging notification message may include the indication that the UE supports beam-specific paging to trigger the network to transmit the paging on a specific beam instead of on multiple beams (e.g., omnidirectionally using a plurality of beams).

In some aspects, a beam used for beam-specific paging may be a beam from a set of beams indicated by the UE. For example, from the plurality of beams on which synchronization signal blocks (SSBs) are transmitted by the network entity, the UE may select a set of best beams (e.g., a set of beams having highest received signal strengths). One or more of the set of beams indicated by the UE may be used for beam-specific paging. The size of the set of best beams may be advertised by the network entity. During a registration process, the UE can provide information about the selected set of best beams. When paging is available for transmission to the UE, the network entity may repeat the page on each beam in the selected set of best beams indicated by the UE.

In some aspects, the network entity may advertise its support for beam-specific paging in messaging broadcast to a UE. For example, support for beam-specific paging may be included in system information transmitted by the network entity (e.g., in an SSB, in a system information update, etc.).

As discussed, to trigger a network entity to transmit paging to a UE, a core network entity, such as an authorization and management function (AMF), may transmit a paging notification message to the network entity. The paging notification message may identify the recipient UE for a paging message and an indication of the mobility state (e.g., stationary or non-stationary) of the recipient UE. If the indication of the mobility state of the recipient UE indicates that the recipient UE is stationary or otherwise supports beam-specific paging, the network entity may transmit the paging message to the recipient UE on a beam that is quasi-colocated with a beam associated with the SSB indicated by a UE during a most recent random access channel procedure (e.g., registration request or registration update procedure). Thus, paging for UEs that are stationary or substantially stationary may be transmitted on a subset of the beams that the network entity can transmit on, which may increase paging channel capacity by freeing resources for transmitting paging messages to other UEs on other beams.

In some aspects, the network entity may configure and advertise an anchor paging frame for stationary UEs. The anchor paging frame may be transmitted periodically every n discontinuous reception (DRX) cycles. During a paging occasion in which the anchor paging frame is transmitted, the network entity may transmit paging messages on a plurality of beams that the network can transmit on (e.g., all supported beams). In other paging occasions, if the UE is still stationary or otherwise indicates that beam-specific paging is supported, the network entity may transmit paging messages on a UE-specific beam, as discussed above.

A UE may attempt to perform beam-specific paging if the serving network entity supports beam-specific paging (e.g., based on the advertisement of support for beam-specific paging in system information broadcast by the serving network entity). If the serving network entity does not indicate support for beam-specific paging, the UE may assume that the serving network entity transmits paging messages on a plurality of beams. Otherwise, during a paging occasion, the UE may monitor for paging on a specific beam. This beam may be, for example, the beam that is quasi-colocated with a beam associated with the SSB selected for a random access channel procedure (e.g., registration request or registration update).

In some aspects, the UE may measure the signal strength of SSBs before a paging occasion for the UE. If the signal strength of the selected SSB has degraded below a threshold signal strength, the UE may select a new SSB (and associated beam). The selected new SSB may be, for example, an SSB that the UE is able to decode or an SSB having the highest received signal strength of a plurality of SSBs that the UE is able to decode. The UE may perform a registration update with the network entity based on the selected new SSB (and its associated beam), and the UE may subsequently receive paging messages on a beam that is quasi-colocated with the beam associated with the selected new SSB.

In some aspects, the UE may change its mobility state, and thus may change its ability to support beam-specific paging. For example, a UE that begins moving from a stationary state may no longer support beam-specific paging. To disable beam-specific paging, the UE may transmit a registration update message to a network entity indicating that the UE is no longer stationary or otherwise no longer supports beam-specific paging. Subsequently, the network entity may transmit paging messages to the UE on a plurality of beams, and the UE may attempt to decode these paging messages by sweeping through the plurality of beams and attempting to decode a received signal on each of the plurality of beams.

In some aspects, a UE may support different paging configurations based on the mobility state of the UE and a mode of the UE. For example, the UE may monitor paging occasions for paging using a specific beam while the UE is in a first mobility state, corresponding to the UE being substantially stationary, and may monitoring paging occasions using multiple beams while the UE is in a second mobility state, corresponding to the UE being in motion.

In some aspects, to use single beam paging in which a network entity transmits paging messages on a single beam, the UE may negotiate the single beam paging with the network entity based on the determination that the UE is still or has no plan to move. That is, the UE, while in the RRC connected state and prior to entering the RRC inactive state or the RRC idle state, determine a mobility state of the UE.

If the UE determines that the mobility state of the UE corresponds to a state in which the UE is stationary or substantially stationary (e.g., based on historical movement activity), the UE can request the BS to perform a single beam paging using a single beam. The single beam may, in some aspects, be a beam that is currently being used for communications between the UE and the network entity, based on an assumption that a current beam used for communications between the UE and the network entity will continue to be an appropriate beam for use in communications between the UE and the network entity while the UE is in the RRC inactive state or the RRC idle state. The current beam may be appropriate because it can be assumed that channel conditions for communications between the UE and the network entity is likely to remain steady, since the UE is not moving enough for these channel conditions to change beyond a de minimis amount.

In some aspects, the mobility state of the UE may be determined based on one or more sensors at the UE. The one or more sensors may detect the current motion of the UE and/or the predict movement of the UE based on estimating that the UE will not move for a period of time. For example, the at least one sensor may include a global positioning system (GPS), a triangulation system using radio signals (e.g., wireless communication (3G/4G LTE/5G NR) signal, WiFi signal, or a Bluetooth signal), an accelerometer, an altimeter, etc. In some aspects, the UE may include a capability to change the position of the UE, e.g., according to a preloaded program code or an autonomous driving, etc. However, the aspects presented herein are not limited thereto, and any form of detecting or estimating the motion of the UE may be implemented to determine the mobility state of the UE.

Based on a determination that the UE is substantially stationary or is expected to remain substantially stationary over a future period of time, the UE may transmit a request to the network entity and a network core entity to perform single beam paging while the UE is in the RRC connected state and prior to the UE entering an RRC idle or RRC inactive state. The request to perform the single beam paging may be transmitted to the network entity through any form of viable communication. For example, the request to perform the single beam may be transmitted to the network entity through an RRC message, an uplink channel (PUCCH or PUSCH), or a physical wireless or wired signal. For example, the request to perform single beam paging may be transmitted to the network entity through a dedicated wireless signal or a hardwired communication. However, the embodiments are not limited thereto, and any form of communication may be implemented to transmit the request to perform single beam paging to the network entity.

The network entity and/or the core network entity may accept the request to perform single beam paging from the UE, and the network entity and the core network entity may transmit one or more paging messages to the UE using a single beam. As discussed, the single beam may be the beam used for communications between the network entity and the UE while the UE is the RRC connected state. That is, the network entity and/or the core network entity may receive the request to perform single beam paging from the UE while the UE is in the RRC inactive state or the RRC idle state. In response, the network entity and/or core network entity can transmit paging messages using the single beam used while the UE is in the RRC connected state.

Subsequently, the UE may enter the RRC inactive state or the RRC idle state. The UE may enter the RRC idle state by the release of the RRC connection or enter the RRC inactive state, for example, by inactivating the RRC connection. After the UE enters the RRC inactive state or the RRC idle state, the UE may monitor for paging transmitted from the network entity using the single beam identified while the UE was in the RRC connected state.

At a later point in time, the UE may detect that the UE is no longer stationary or substantially stationary while the UE is in an idle or inactive state. The UE can determine that the UE is no longer stationary or substantially stationary based on data generated by one or more sensors integrated into or communicatively coupled with the UE, such as accelerometers, gyroscopes, other motion sensors, satellite positioning system receivers (e.g., NAVSTAR GPS, GLONASS, GALILEO, etc.), or other devices that can detect UE movement and/or position information. The UE may thus determine that the mobility state of the UE has changed from stationary or substantially stationary to in motion based on one or more of current motion of the UE or a predicted movement of the UE based on an estimation that the UE will move more than a threshold amount over a period of time.

In response to determining that the mobility state of the UE has changed from stationary or substantially stationary to in motion, the UE can transmit a request to the network entity and/or core network entity to stop single beam paging and resume beam sweeping paging such that paging messages are transmitted by the network entity using multiple beams. Subsequently, the UE may monitor for paging transmitted from the network entity using beam sweeping. The UE may, for example, monitor multiple beams to receive a paging message transmitted by the network entity using multiple beams, which may improve the reliability of data reception when the UE transitions from a stationary or substantially stationary state to a moving state.

Figure 7:
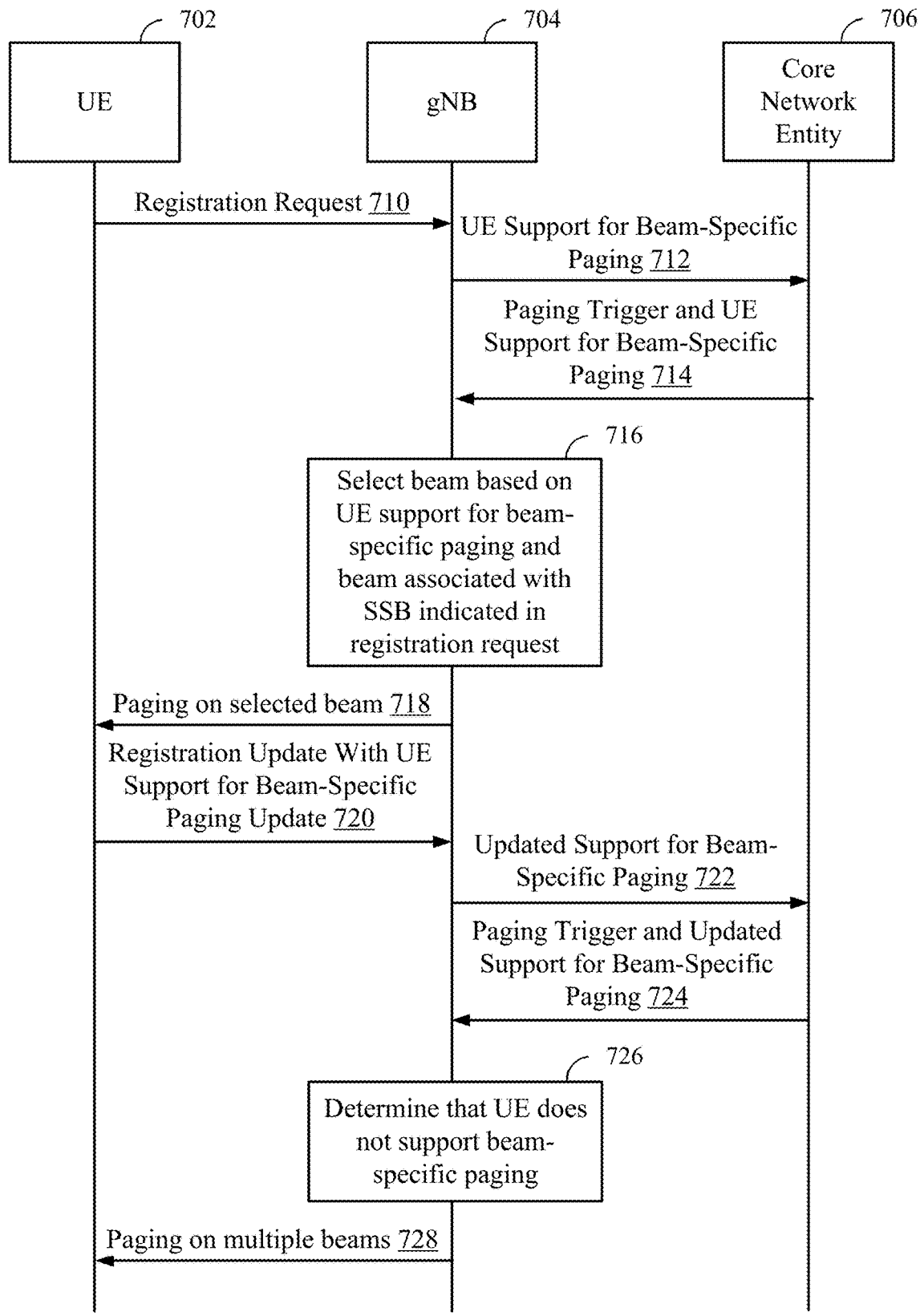
FIG. 7 is a message flow diagram illustrating example messages that may be exchanged between a user equipment (UE), network entity, and a core network entity for beam-specific paging, in accordance with some aspects of the present disclosure.

FIG. 7 is a message flow diagram illustrating example messages that may be exchanged between a UE 702, a gNB (network entity) 704, and a core network entity 706 for beam-specific paging, in accordance with some aspects of the present disclosure.

As illustrated, UE 702 may transmit a registration request 710 to gNB 704 (which, as discussed, may pass the registration request 710 to a core network entity 706). The registration request may be transmitted based on a synchronization signal block (SSB) that the UE was able to decode, and the SSB may be associated with a selected beam direction. The registration request may further include information about whether the UE supports beam-specific paging. As discussed, whether the UE supports beam-specific paging may be based, for example, on whether the UE is stationary or substantially stationary, or other mobility state information. gNB 704 may transmit UE mobility state 712 to core network entity 706 to use in triggering the transmission of paging messages to the UE 702.

Subsequently, when paging is available for transmission to the UE 702, the core network entity 706 may transmit a paging trigger 714 including the indication of whether the UE supports beam-specific paging. Because the indication indicates that the UE supports beam-specific paging, at block 716, the gNB may select a beam for transmitting the paging message based on a beam associated with the SSB indicated in the registration request. As discussed, the selected beam for transmitting the paging message may be a beam that is quasi-colocated with a beam associated with the SSB indicated in the registration request. The gNB 704 may subsequently transmit the paging 718 using the selected beam.

At a later time, if a UE begins moving or otherwise discontinues its support for beam-specific paging, the UE may transmit, to gNB 704, a registration update message 720 including an update to whether the UE supports beam-specific paging. gNB 704 may forward the updated mobility state 722 to core network entity 706 for the core network entity 706 to use in signaling how the gNB 704 is to transmit paging messages, as discussed above. Subsequently, the core network entity 706 may transmit a paging trigger 724 with the updated indication that that the UE no longer supports beam-specific paging. At block 726, the gNB determines that the UE no longer supports beam-specific paging (e.g., based on an absence of an indication that the UE supports beam-specific paging), and gNB 704 may transmit the paging 728 on multiple beams.

Figure 8:
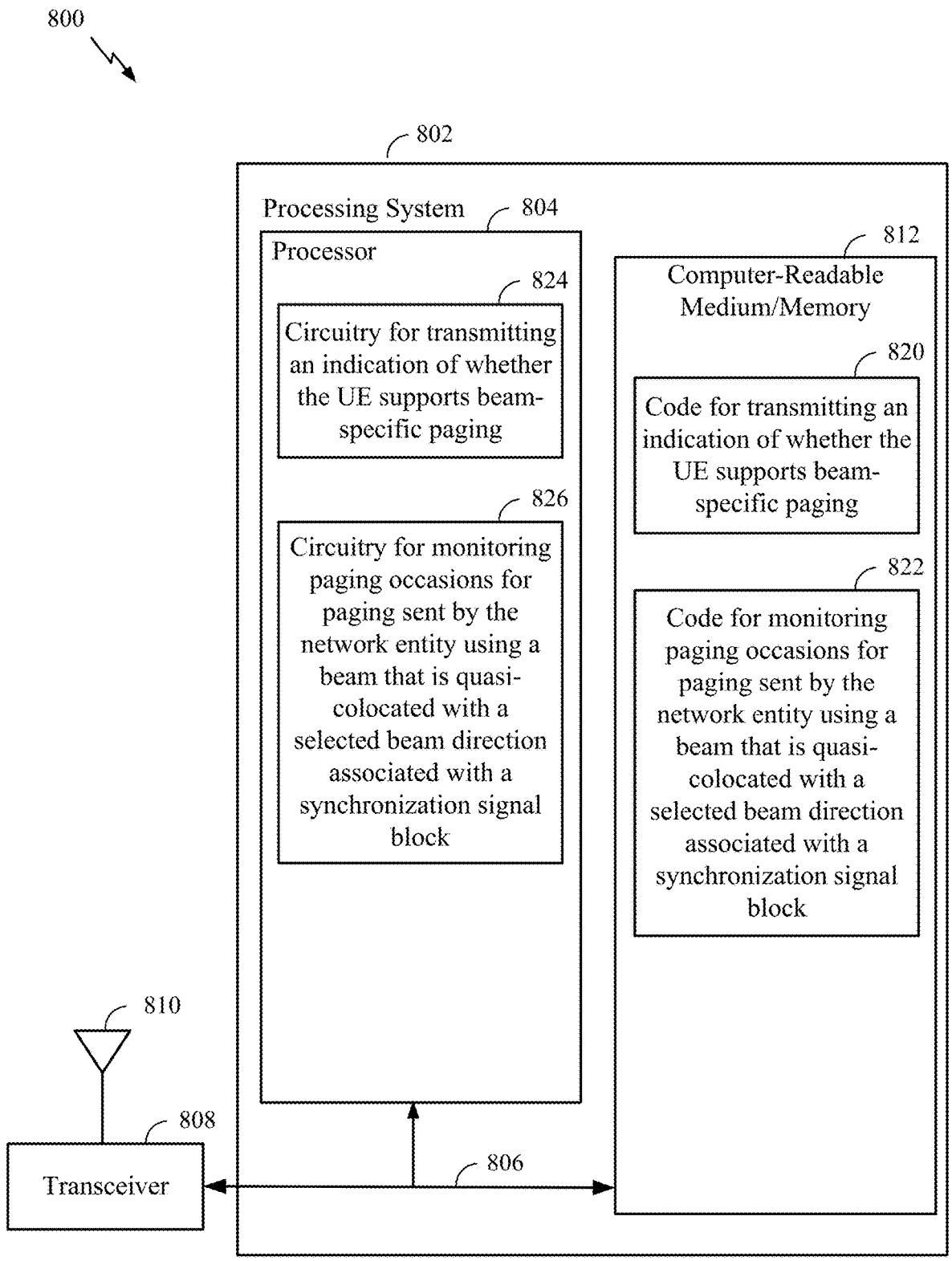
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4, or other operations for performing the various techniques discussed herein for beam-specific paging. In certain aspects, computer-readable medium/memory 812 stores code 820 for transmitting an indication of whether the UE supports beam-specific paging, and code 822 for monitoring paging occasions for paging sent by the network entity using a beam that is quasi-colocated with a selected beam direction associated with a synchronization signal block. In certain aspects, the processor 804 has circuitry configured to implement the code stored in the computer-readable medium/memory 812. The processor 804 includes circuitry 824 for transmitting an indication of whether the UE supports beam-specific paging, and circuitry 826 for monitoring paging occasions for paging sent by the network entity using a beam that is quasi-colocated with a selected beam direction associated with a synchronization signal block.

Figure 9:
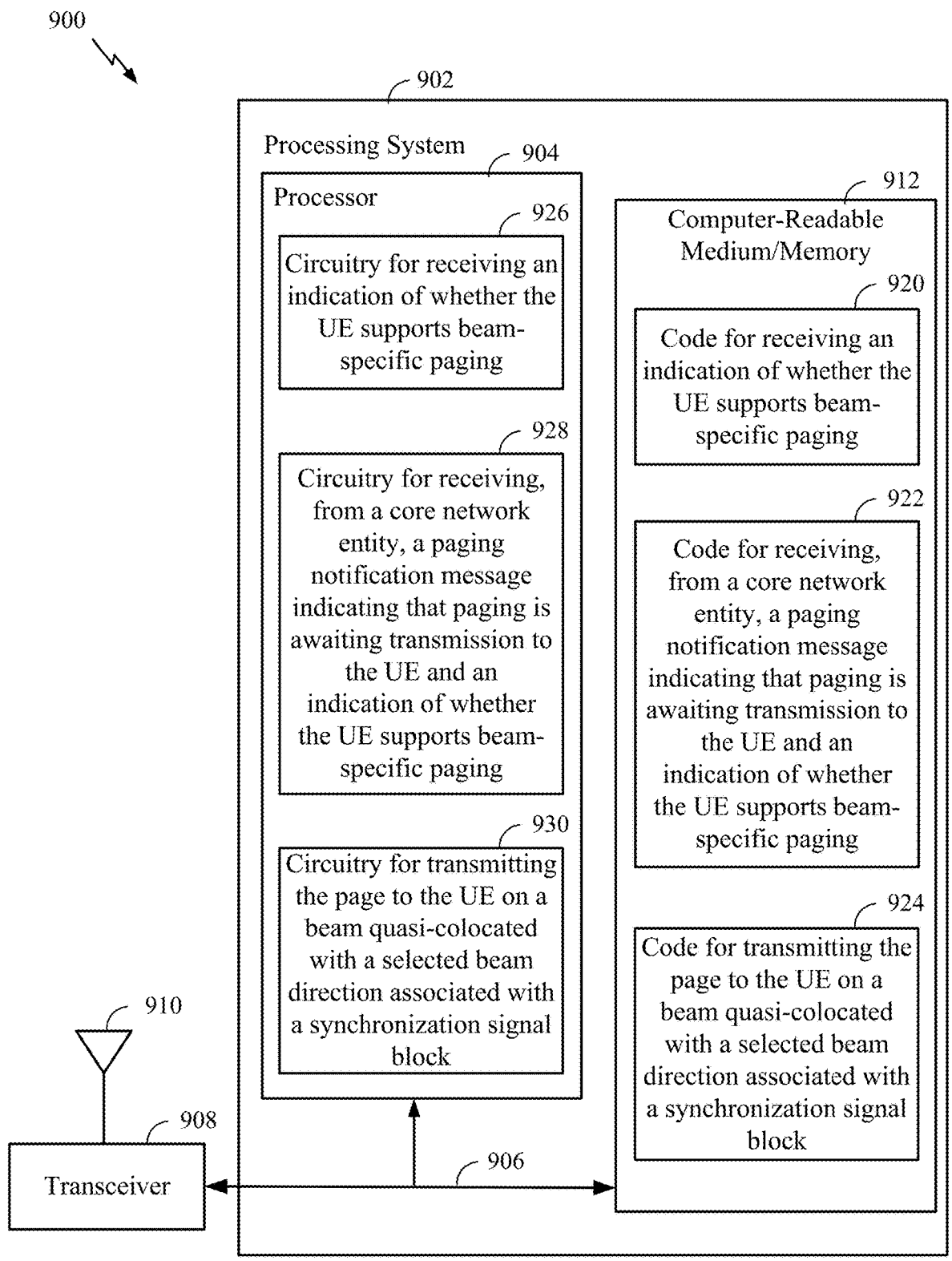
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5, or other operations for performing the various techniques discussed herein for beam-specific paging. In certain aspects, computer-readable medium/memory 912 stores code 920 for receiving an indication of whether the UE supports beam-specific paging; code 922 for receiving, from a core network entity, a paging notification message indicating that paging is awaiting transmission to the UE and an indication of whether the UE supports beam-specific paging; and code 924 for transmitting the page to the UE on a beam quasi-colocated with a selected beam direction associated with a synchronization signal block. In certain aspects, the processor 904 has circuitry configured to implement the code stored in the computer-readable medium/memory 912. The processor 904 includes circuitry 926 for receiving an indication of whether the UE supports beam-specific paging; circuitry 928 for receiving, from a core network entity, a paging notification message indicating that paging is awaiting transmission to the UE and an indication of whether the UE supports beam-specific paging; and circuitry 930 for transmitting the page to the UE on a beam quasi-colocated with a selected beam direction associated with a synchronization signal block.

Figure 10:
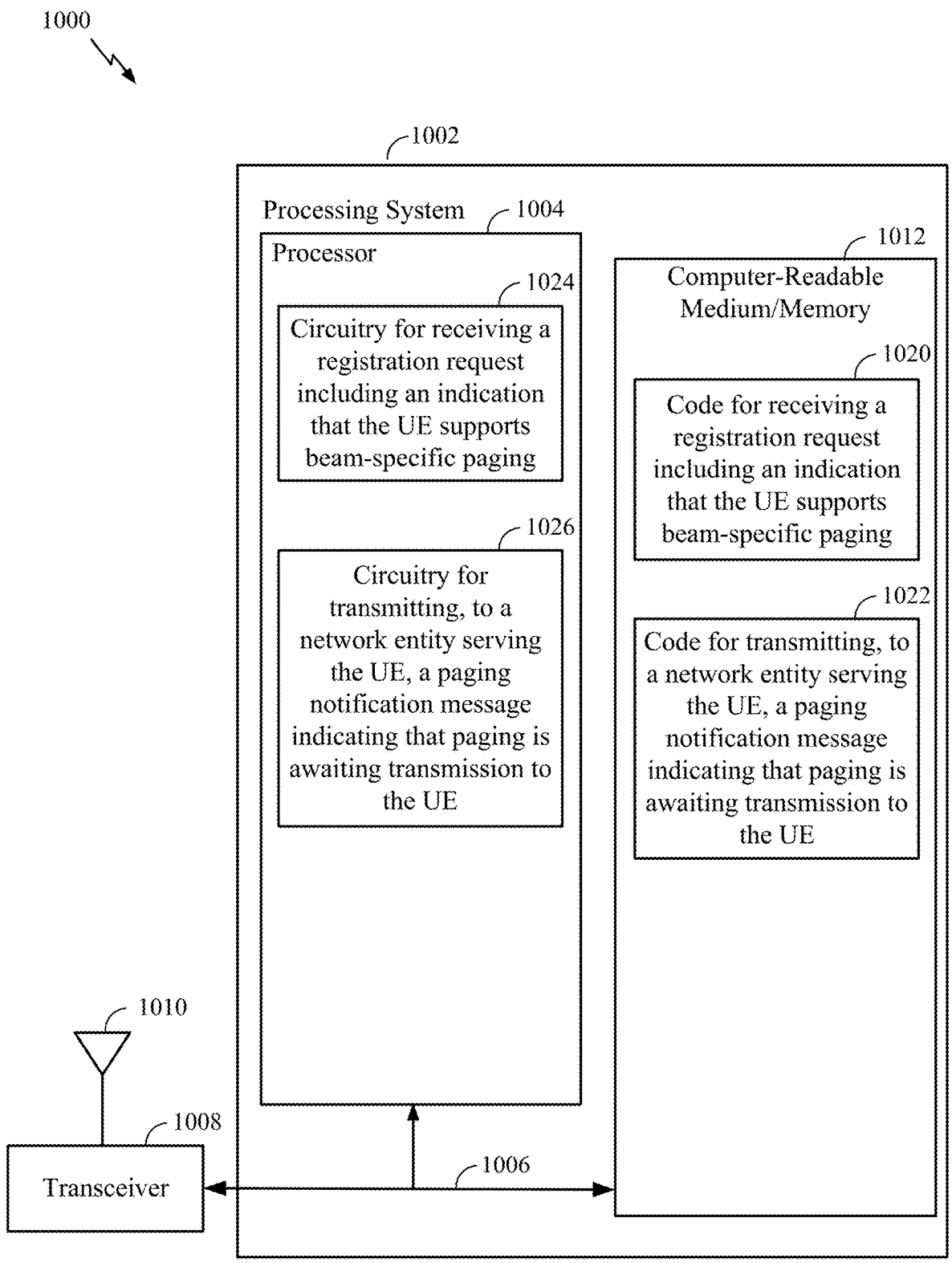
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 6. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 6, or other operations for performing the various techniques discussed herein for beam-specific paging. In certain aspects, computer-readable medium/memory 1012 stores code 1020 for receiving a registration request including an indication that the UE supports beam-specific paging; and code 1022 for transmitting, to a network entity serving the UE, a paging notification message indicating that paging is awaiting transmission to the UE. In certain aspects, the processor 1004 has circuitry configured to implement the code stored in the computer-readable medium/memory 1012. The processor 1004 includes circuitry Example Clauses Clause 1: A method for wireless communications by a user equipment (UE), comprising: transmitting, to a network entity, an indication of a mobility state of the UE, wherein the indication is transmitted based on a synchronization signal block (SSB) associated with a selected beam direction; and monitoring paging occasions for paging sent using a beam that is quasi-colocated with the selected beam direction associated with the SSB.

Clause 2: The method of Clause 1, wherein the indication of a mobility state comprises a registration request indicating that the UE supports beam-specific paging.

Clause 3: The method of any one of Clauses 1 or 2, further comprising: measuring a signal strength of a plurality of SSBs prior to a paging occasion for the UE; determining that the signal strength of the SSB associated with the selected beam direction has degraded to below a threshold level; identifying a new SSB based on measuring the signal strength of the plurality of SSBs; and performing, with the network entity, a registration update based on the identified new SSB.

Clause 4: The method of Clause 3, further comprising: monitoring paging occasions for paging sent using a beam that is quasi-colocated with a beam direction associated with the identified new SSB.

Clause 5: The method of any one of Clauses 1 through 4, further comprising: monitoring for paging during a configured anchor paging cycle on all beams including the beam quasi-colocated with the selected beam direction associated with the SSB.

Clause 6: The method of any one of Clauses 1 through 5, wherein the UE is configured to monitor paging occasions for paging sent on the beam that is quasi-colocated with a beam direction associated with the identified SSB if the network entity indicates support for a beam-specific paging procedure.

Clause 7: The method of any one of Clauses 1 through 6, further comprising: transmitting, to the network entity, a mobility indication indicating that the UE does not support beam-specific paging; and monitoring paging occasions for paging sent on all beams, subsequent to transmitting the mobility indication indicating that the UE does not support beam-specific paging.

Clause 8: The method of any one of Clauses 1 through 7, further comprising: transmitting, to the network entity, a request to perform single beam paging based on the mobility state of the UE, wherein the indication of the mobility state of the UE comprises an indication that the UE is substantially stationary; and entering a radio resource control (RRC) inactive state or an RRC idle state, wherein monitoring paging occasions comprises monitoring for a page from the network entity based on a single beam.

Clause 9: The method of Clause 8, further comprising: determining the mobility state of the UE based on predicted movement of the UE, wherein determining that the UE is substantially stationary is based on an estimation that the UE will not move during a period of time.

Clause 10: The method of any one of Clauses 8 or 9, further comprising: determining the mobility state of the UE based on current motion of the UE.

Clause 11: The method of any one of Clauses 8 through 10, wherein: the single beam paging comprises paging for the RRC inactive state or RRC idle state of the UE, the mobility state is determined while the UE is in an RRC connected state, and the request to perform single beam paging is transmitted prior to transitioning to the RRC inactive or RRC idle state.

Clause 12: The method of any one of Clauses 8 through 11, wherein the single beam paging is based on a single beam used while the UE is in an RRC connected state.

Clause 13: The method of any one of Clauses 8 through 12, further comprising: determining, while the UE is in the RRC inactive state or the RRC idle state, that the mobility state of the UE corresponds to a state in which the UE is in motion; and transmitting, to the network entity, a request to perform beam sweeping paging based on the determining that the mobility state of the UE corresponds to a state in which the UE is in motion.

Clause 14: The method of Clause 13, wherein monitoring the paging occasions comprises monitoring for paging from the network entity using multiple beams.

Clause 15: A method for wireless communications by a network entity, comprising: receiving, from a user equipment (UE), an indication of a mobility state of the UE, wherein the indication is received based on a synchronization signal block (SSB) associated with a selected beam direction; receiving, from a core network entity, a paging notification message indicating that paging is awaiting transmission to the UE and an indication that the UE supports beam-specific paging; and transmitting the page to the UE on a beam quasi-colocated with the selected beam direction associated with the SSB.

Clause 16: The method of Clause 15, wherein the indication of a mobility state comprises a registration request indicating that the UE supports beam-specific paging.

Clause 17: The method of any one of Clauses 15 or 16, further comprising: receiving, from the UE, a registration update message indicating selection of a new SSB; and transmitting subsequent pages to the UE on a beam quasi-colocated with a beam associated with the new SSB.

Clause 18: The method of any one of Clauses 15 through 17, further comprising: transmitting, to the UE during an anchor paging cycle, paging on all beams.

Clause 19: The method of any one of Clauses 15 through 18, further comprising: transmitting, to the UE, an indication that the network entity supports beam-specific paging.

Clause 20: The method of any one of Clauses 15 through 19, further comprising: receiving, from the UE, a registration update message indicating that the UE does not support beam-specific paging; and discontinuing beam-specific paging with the UE based on the indication that the UE does not support beam-specific paging.

Clause 21: The method of any one of Clauses 15 through 20, further comprising: receiving, from the UE, a request to perform single beam paging based on the mobility state of the UE, wherein the indication of the mobility state of the UE comprises an indication that the UE is substantially stationary; and paging the UE using a single beam based on receiving the request to perform single beam paging.

Clause 22: The method of Clause 21, wherein the single beam paging comprises paging for a radio resource control (RRC) inactive state or RRC idle state of the UE.

Clause 23: The method of any one of Clauses 21 or 22, wherein the request is received from the UE while the UE is in a radio resource control (RRC) connected state.

Clause 24: The method of any one of Clauses 21 through 23, wherein the network entity is configured to page the UE using the single beam while the UE is in a radio resource control (RRC) inactive state or an RRC idle state.

Clause 25: The method of any one of Clauses 21 through 24, further comprising: receiving, from the UE, a request to perform beam sweeping paging; and paging the UE using multiple beams based on receiving the request.

Clause 26: A method for wireless communications by a core network entity, comprising: receiving, from a user equipment (UE), a registration request including an indication that the UE supports beam-specific paging; and transmitting, to a network entity serving the UE, a paging notification message indicating that paging is awaiting transmission to the UE, wherein the paging notification message includes the indication that the UE supports beam-specific paging to trigger the network entity to transmit the paging on a specific beam.

Clause 27: The method of Clause 26, further comprising: receiving, from the UE, a registration update including an indication that the UE does not support beam-specific paging; and transmitting, to the network entity serving the UE, a second paging notification message indicating that paging is awaiting transmission to the UE, wherein the paging notification includes the indication that that the UE does not support beam-specific paging to trigger the network entity to transmit the paging on a plurality of beams.

Clause 28: An apparatus, comprising: a memory having instructions stored thereon; and a processor configured to execute the executable instructions to cause the apparatus to perform the operations of any one of Clauses 1 through 27.

Clause 29: An apparatus, comprising: means for performing the operations of any one of Clauses 1 through 27.

Clause 30: A computer-readable medium having executable instructions stored thereon which, when executed by a processor, performs the operations of any one of Clauses 1 through 27.

Further Considerations

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20

MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A method for wireless communications by a user equipment (UE), comprising:
   transmitting, to a network entity, an indication of a mobility state of the UE, wherein the indication is transmitted based on a synchronization signal block (SSB) associated with a selected beam direction; and
   monitoring paging occasions for paging sent using a beam that is quasi-colocated with the selected beam direction associated with the SSB.

2. The method of claim 1, wherein the indication of the mobility state comprises a registration request indicating that the UE supports beam-specific paging.

3. The method of claim 1, further comprising:
   measuring a signal strength of a plurality of SSBs prior to a paging occasion for the UE;

determining that the signal strength of the SSB associated with the selected beam direction has degraded to below a threshold level;
identifying a new SSB based on measuring the signal strength of the plurality of SSBs; and
performing, with the network entity, a registration update based on the identified new SSB.

4. The method of claim 3, further comprising:
monitoring paging occasions for paging sent using a beam that is quasi-colocated with a beam direction associated with the identified new SSB.

5. The method of claim 1, further comprising:
monitoring for paging during a configured anchor paging cycle on all beams including the beam quasi-colocated with the selected beam direction associated with the SSB.

6. The method of claim 1, wherein the UE is configured to monitor paging occasions for paging sent on the beam that is quasi-colocated with a beam direction associated with an identified SSB if the network entity indicates support for a beam-specific paging procedure.

7. The method of claim 1, further comprising:
transmitting, to the network entity, a mobility indication indicating that the UE does not support beam-specific paging; and
monitoring paging occasions for paging sent on all beams, subsequent to transmitting the mobility indication indicating that the UE does not support beam-specific paging.

8. The method of claim 1, further comprising:
transmitting, to the network entity, a request to perform single beam paging based on the mobility state of the UE, wherein the indication of the mobility state of the UE comprises an indication that the UE is substantially stationary; and
entering a radio resource control (RRC) inactive state or an RRC idle state,
wherein monitoring paging occasions comprises monitoring for a page from the network entity based on a single beam.

9. The method of claim 8, further comprising:
determining the mobility state of the UE based on predicted movement of the UE, wherein determining that the UE is substantially stationary is based on an estimation that the UE will not move during a period of time.

10. The method of claim 8, further comprising:
determining the mobility state of the UE based on current motion of the UE.

11. The method of claim 8, wherein at least one of:
the single beam paging comprises paging for the RRC inactive state or the RRC idle state of the UE,
the mobility state is determined while the UE is in an RRC connected state, or
the request to perform single beam paging is transmitted prior to transitioning to the RRC inactive or RRC idle state.

12. The method of claim 8, wherein the single beam paging is based on a single beam used while the UE is in an RRC connected state.

13. The method of claim 8, further comprising:
determining, while the UE is in the RRC inactive state or the RRC idle state, that the mobility state of the UE corresponds to a state in which the UE is in motion; and
transmitting, to the network entity, a request to perform beam sweeping paging based on the determining that the mobility state of the UE corresponds to a state in which the UE is in motion.

14. The method of claim 13, wherein monitoring the paging occasions comprises monitoring for paging from the network entity using multiple beams.

15. A method for wireless communications by a network entity, comprising:
receiving, from a user equipment (UE), an indication of a mobility state of the UE, wherein the indication is received based on a synchronization signal block (SSB) associated with a selected beam direction;
receiving, from a core network entity, a paging notification message indicating that paging is awaiting transmission to the UE and an indication that the UE supports beam-specific paging; and
transmitting a page to the UE on a beam quasi-colocated with the selected beam direction associated with the SSB.

16. The method of claim 15, wherein the indication of the mobility state comprises a registration request indicating that the UE supports beam-specific paging.

17. The method of claim 15, further comprising:
receiving, from the UE, a registration update message indicating selection of a new SSB; and
transmitting subsequent pages to the UE on a beam quasi-colocated with a beam associated with the new SSB.

18. The method of claim 15, further comprising:
transmitting, to the UE during an anchor paging cycle, paging on all beams.

19. The method of claim 15, further comprising:
transmitting, to the UE, an indication that the network entity supports beam-specific paging.

20. The method of claim 15, further comprising:
receiving, from the UE, a registration update message indicating that the UE does not support beam-specific paging; and
discontinuing beam-specific paging with the UE based on the indication that the UE does not support beam-specific paging.

21. The method of claim 15, further comprising:
receiving, from the UE, a request to perform single beam paging based on the mobility state of the UE, wherein the indication of the mobility state of the UE comprises an indication that the UE is substantially stationary; and
paging the UE using a single beam based on receiving the request to perform single beam paging.

22. The method of claim 21, wherein the single beam paging comprises paging for a radio resource control (RRC) inactive state or RRC idle state of the UE.

23. The method of claim 21, wherein the request is received from the UE while the UE is in a radio resource control (RRC) connected state.

24. The method of claim 21, wherein the network entity is configured to page the UE using the single beam while the UE is in a radio resource control (RRC) inactive state or an RRC idle state.

25. The method of claim 21, further comprising:
receiving, from the UE, a request to perform beam sweeping paging; and
paging the UE using multiple beams based on receiving the request.

26. A method for wireless communications by a core network entity, comprising:
receiving, from a user equipment (UE), a registration request including an indication that the UE supports beam-specific paging; and transmitting, to a network entity serving the UE, a paging notification message indicating that paging is awaiting transmission to the UE, wherein the paging notification message includes the indication that the UE supports beam-specific paging to trigger the network entity to transmit the paging on a specific beam.

27. The method of claim 26, further comprising:

receiving, from the UE, a registration update including an indication that the UE does not support beam-specific paging; and transmitting, to the network entity serving the UE, a second paging notification message indicating that paging is awaiting transmission to the UE, wherein the second paging notification message includes the indication that that the UE does not support beam-specific paging to trigger the network entity to transmit the paging on a plurality of beams.

28. A user equipment (UE), comprising:

a transceiver;

a memory having executable instructions stored thereon; and a processor configured to execute the executable instructions and to cause the UE to:

transmit to a network entity, via the transceiver, an indication of a mobility state of a user equipment (UE), wherein the indication is transmitted based on a synchronization signal block (SSB) associated with a selected beam direction; and monitor paging occasions for paging sent using a beam that is quasi-colocated with the selected beam direction associated with the SSB.

29. The UE of claim 28, wherein the processor is further configured to cause the UE to:

measure a signal strength of a plurality of SSBs prior to a paging occasion for the UE;

determine that the signal strength of the SSB associated with the selected beam direction has degraded to below a threshold level;

identify a new SSB based on measuring the signal strength of the plurality of SSBs; and perform, with the network entity, a registration update based on the new SSB.

30. The UE of claim 28, wherein the processor is further configured to cause the UE to:

transmit to the network entity, via the transceiver, a mobility indication indicating that the UE does not support beam-specific paging; and monitor paging occasions for paging sent on all beams, subsequent to transmitting the mobility indication indicating that the UE does not support beam-specific paging.

* * * * *

UNITED STATES PATENT AND TRADEMARK OFFICE
CERTIFICATE OF CORRECTION

PATENT NO. : 11,653,329 B2
APPLICATION NO. : 17/369515
DATED : May 16, 2023
INVENTOR(S) : Nan Zhang and Linhai He It is certified that error appears in the above-identified patent and that said Letters Patent is hereby corrected as shown below:

On the Title Page

Insert:
--(30) Foreign Application Priority Data
July 16, 2020 (CN).......................PCT/CN2020/102317--

Signed and Sealed this
Thirteenth Day of June, 2023

Katherine Kelly Vidal
*Director of the United States Patent and Trademark Office*